(12) United States Patent
Haberl et al.

(10) Patent No.: US 8,356,854 B2
(45) Date of Patent: Jan. 22, 2013

(54) HOOD FOR A CONVERTIBLE VEHICLE

(75) Inventors: Franz Haberl, Wallerfing (DE); Georg Kopp, Plattling (DE)

(73) Assignee: Webasto-Edscha Cabrio GmbH, Hengersberg (DE)

( * ) Notice: Subject to any disclaimer, the term of this patent is extended or adjusted under 35 U.S.C. 154(b) by 92 days.

(21) Appl. No.: 12/708,701

(22) Filed: Feb. 19, 2010

(65) Prior Publication Data

US 2010/0259066 A1   Oct. 14, 2010

(30) Foreign Application Priority Data

Feb. 19, 2009 (DE) .......................... 10 2009 009 596

(51) Int. Cl.
*B60J 7/00* (2006.01)
(52) U.S. Cl. .................................. 296/107.09; 296/121
(58) Field of Classification Search ............. 296/107.09, 296/116, 109, 121
See application file for complete search history.

(56) References Cited

U.S. PATENT DOCUMENTS

| | | | | |
|---|---|---|---|---|
| 6,270,143 B1* | 8/2001 | Heselhaus et al. | ....... | 296/107.01 |
| 6,659,533 B1* | 12/2003 | Grubbs | ..................... | 296/107.07 |
| 6,692,061 B1* | 2/2004 | Willard | ......................... | 296/116 |
| 7,300,095 B2* | 11/2007 | Rawlings et al. | ............. | 296/116 |
| 7,654,606 B2* | 2/2010 | Hollenbeck et al. | .......... | 296/122 |
| 2001/0040385 A1* | 11/2001 | Obendiek | ..................... | 296/108 |
| 2008/0315633 A1 | 12/2008 | Antreich et al. | | |

FOREIGN PATENT DOCUMENTS

| | | |
|---|---|---|
| DE | 196 42 152 A1 | 4/1998 |
| DE | 101 19 069 A1 | 10/2002 |
| DE | 10 2005 058 921 A1 | 6/2007 |
| EP | 0 835 780 B1 | 7/2001 |

* cited by examiner

*Primary Examiner* — Joseph Pape
(74) *Attorney, Agent, or Firm* — Davidson, Davidson & Kappel, LLC

(57) ABSTRACT

The invention relates to a folding top for a convertible vehicle, wherein the folding top can be displaced between a closed position and an opened position, comprising a main guide link mechanism with a first main guide link, a second main guide link and a guide link element, and a first folding top element, wherein the first folding top element pivotally couples the first main guide link and the second main guide link together, and wherein, starting from the closed position of the folding top, one of the first main guide link and the second main guide link can be displaced in a vertical direction by a swiveling of the guide link element.

17 Claims, 17 Drawing Sheets

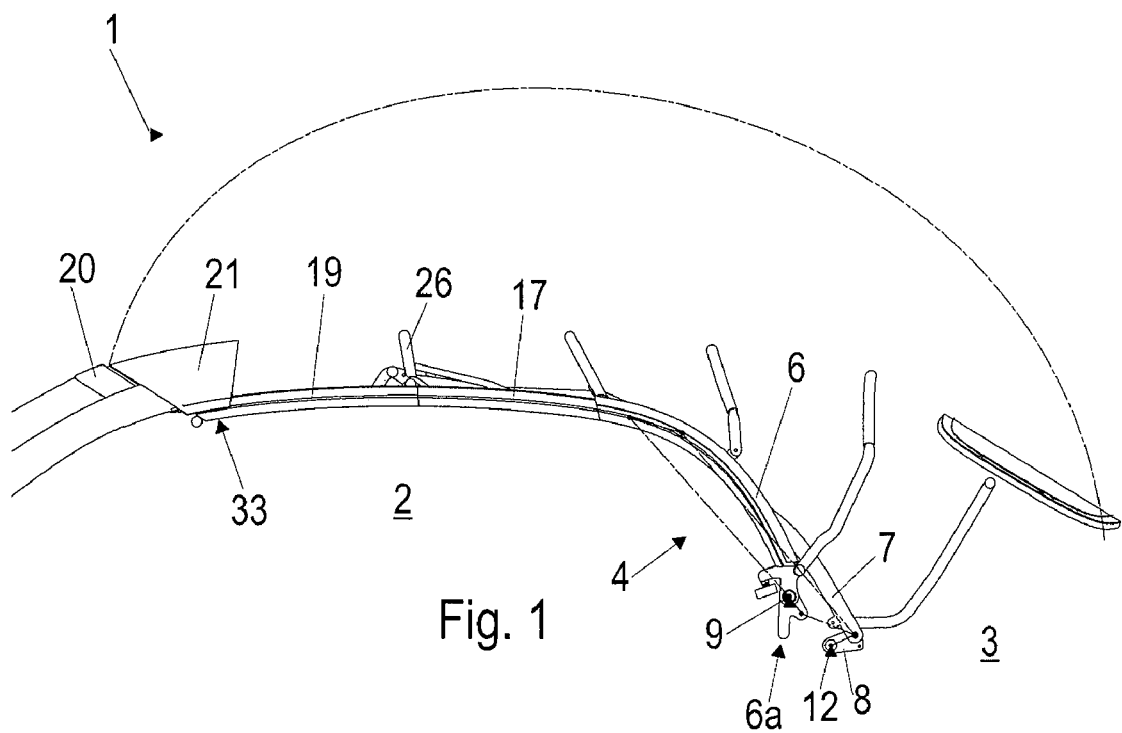

HOOD FOR A CONVERTIBLE VEHICLE

BACKGROUND OF THE INVENTION

The invention relates to a folding top for a convertible vehicle.

Folding tops for convertible vehicles, which are fixed to the vehicle body by means of lateral guide linkages, and which can be displaced, positively controlled by the guide linkage, between a closed position covering the vehicle passenger compartment and an open position exposing the vehicle passenger compartment, are known in practice. A displacement of the folding top can in this case be automated by means of a drive device or can be done by manually swiveling the folding top. The extent of the folding top in the direction of travel is particularly large, particularly on convertible vehicles having two or more rows of seats. One problem here is that in the course of an opening movement the folding top first swings upwards and in so doing also covers a relatively large sweep in a vertical direction. The maximum height attained by folding top parts in the course of the travel movement defines a minimum clear overall height needed for opening the folding top, which must not exceed a normal garage height even in the case of a large folding top, so as to avoid damaging the folding top. At the same time parts of the folding top must not intrude into the vehicle passenger compartment in the course of the displacement movement, in order to exclude any risk of injury to the vehicle passengers.

FIGS. 11 to 16 show a convertible folding top 101 known from the state of the art. The folding top 101 is embodied as a fabric folding top and comprises a main guide link mechanism 104, embodied as a main four-bar linkage with a first main guide link 106 and a second main guide link 107. The main guide links 106, 107 are each mounted on a main bearing unit 105, which is fixed to the vehicle body and which forms the basis of the main four-bar linkage, allowing them to swivel at one end close to the vehicle body. A first folding top element 117 embodied as a roof frame element is in each case articulated in the area of an end of the first main guide link 106 and the second main guide link 107 remote from the vehicle body and forms a coupling link of the main four-bar linkage. Adjoining and in front of the folding top element 117 in the direction of travel is a second folding top element 119, which forms a second roof frame element and which when the folding top 101 is closed lies adjacent to a cowl 120 of the convertible vehicle. When the folding top is displaced from the closed position into the opened position, the second folding top element 119, the first folding top element 117 and the first main guide link 106 swivel in an z-shape into a rear stowage area, a front bow 121 arranged at the front end of the second folding top element 119, viewed in the direction of travel, describing an upwardly expanding trajectory curve, the maximum height of which defines the minimum clear overall height needed for opening the folding top. The folding top 101 comprises a drive element 127, which is embodied as a gas-filled compression spring and which assists a swiveling of the folding top 101. At a first end the drive element 127 acts on the first main guide link 106 and at its second end is supported on the main bearing unit 105. Starting from the closed position of the folding top, the drive element 127 first assists a swiveling of the first main guide link 106 counter to the direction of travel, until a middle position of the folding top is reached (FIG. 12). In this position of the folding top the drive element 127 is in a dead-point position relative to the first main guide link 106, so that no torque can be transmitted to the first main guide link 106. In this position the drive element 127 has reached its maximum adjustment travel. Further displacement of the folding top 101 towards the opened position causes the first main guide link 106 to swivel further counter to the direction of travel, so that the drive element 127 is deflected out of the dead-point position and is tensioned by the main guide link 106. The displacement movement of the folding top 101 is now correspondingly braked by the drive element 127. A disadvantage of the arrangement shown in FIG. 11 to FIG. 16 is that the folding top 101 needs a large clear overall height, since the front bow 121, particularly in a middle range of the displacement movement, rises up a long way.

DE 101 19 069 A1 describes a folding top for a convertible vehicle, which is embodied as a hard-shell folding top and which can be displaced by means of a drive device between a closed position and an opened position. The folding top has a main guide link mechanism embodied as a seven-bar linkage, which comprises a first main guide link and a guide link element, which are each articulated in a joint fixed to the vehicle body. A second main guide link is articulated on an end of the guide link element remote from the vehicle body. A roof element embodied as a middle roof shell part is in each case articulated on an end of the first main guide link and of the second main guide link remote from the vehicle body and couples these together. The main guide link mechanism further comprises a coupling link, which is articulated on the first main guide link on the one hand and on the guide link element on the other. The drive device in the form of a linear drive acts at a first end on the first main guide link and is supported at a second end in a pivot point fixed to the vehicle body. The distance from the point of action of the drive device on the first main guide link to the first pivot point of the first main guide link fixed to the vehicle body defines a first lever arm, by way of which the drive device introduces a torque into the main guide link mechanism. One disadvantage to this folding top arrangement is that a large clear overall height is needed for opening the folding top.

DE 10 2005 058 921 A1 describes a folding top for a convertible vehicle, which can be displaced between a closed position and an opened position. The folding top comprises a main guide link mechanism with a first main guide link and a second main guide link, which at a first end are each pivotally connected to a first roof part and at a second end are each pivotally connected to a console fixed to the vehicle body. The first main guide link, the second main guide link, the first roof part and the console together form a first four-bar linkage arrangement, having the console as its base and the first roof part as its coupling link. The folding top further comprises a drive kinematic chain, comprising a first, curved drive link and a second short drive link. At a first end the first drive link is articulated on the console of the folding top and at a second end it is pivotally connected to a first end of the second drive link. At a second end the second drive link has an articulated connection to the first main guide link, so that the first drive link, the second drive link, the second main guide link and the console together form a second four-bar linkage arrangement, having the console as its base and the second drive link as its coupling link. A swiveling of the second four-bar linkage arrangement can be driven by means of a linear drive unit embodied as a linear cylinder. At a first end the linear drive unit is supported in a pivot point on the console of the folding top and at a second end on the first drive link, and drives the latter directly.

DE 196 42 152 A1 describes a hard-shell folding top for a convertible vehicle, which can be displaced between a closed position and an opened position. The folding top comprises a first, rear roof part, a second, middle roof part and a third, front roof part. At a first end a first main guide link is swivel-mounted on a vehicle body and at a second end it is swivel-mounted on the first roof part. A linear drive unit embodied as a linear cylinder is articulated at a first end on the vehicle body and at a second end on a first end of a drive link. A second end of the drive link has an articulated connection by way of an intermediate guide link to the second roof part. The first roof part and the second roof part are pivotally connected to one another by a roof part guide link and additionally comprise a locking unit, which serves to lock the first roof part to the second roof part. To open the folding top, the first roof part is locked to the second roof part and the drive link is displaced by means of the linear drive unit, so that the first roof part and the second roof part are swiveled together, guided by the first main guide link. The locking of the first roof part and the second roof part is then cancelled and the second roof part is swiveled by displacement of the drive link below the first roof part.

SUMMARY OF THE INVENTION

An object of the invention is to specify a folding top for a convertible vehicle, which requires little space for an opening movement.

According to a first aspect of the invention a folding top for a convertible vehicle is created, wherein the folding top can be displaced between a closed position and an opened position, the folding top comprising a main guide link mechanism with a first main guide link, a second main guide link and a guide link element, and a first folding top element, wherein the first folding top element pivotally couples the first main guide link and the second main guide link together, and wherein, starting from the closed position of the folding top, one of the first main guide link and the second main guide link can be displaced in a vertical direction by a swiveling of the guide link element.

The facility for vertical displacement of the one of the first main guide link and the second main guide link advantageously applies a component motion to the first folding top element coupled to the first main guide link and the second main guide link, which reduces the overall height covered in a displacement movement of the folding top, compared to a conventional articulation. The vertical displacement of the one of the first main guide link and the second main guide link is here preferably capable of applying a component motion, directed towards the vehicle passenger compartment, to a front end of the first folding top element, viewed in the direction of travel, so that the clear overall height needed for displacement of the folding top is advantageously reduced. In a preferred development of the folding top, in which a second folding top element is mounted on the first folding top element, the second folding top element is hereby advantageously displaced towards the vehicle passenger compartment, which considerably reduces the clear overall height needed for the displacement of the folding top. The one of the first main guide link and the second main guide link is preferably fully displaceable in relation to a vehicle body of the convertible vehicle, so that a particular flexibility is achieved in the control of the first folding top element. It has to be understood that owing to the component motion towards the vehicle passenger compartment applied to the folding top elements when displacing the folding top they do not drop below a roof line defined by the closed folding top, so that during the displacing movement no part of the folding top comes into the head area of the vehicle passengers.

A displacement of the one of the first main guide link and the second main guide link appropriately has at least one component directed vertically upwards or vertically downwards, depending on whether the guide link in question is a rear or front guide link, viewed in the direction of travel. It has to be understood that the application of a component motion of the first folding top element towards the vehicle passenger compartment can also be obtained by a displacement both of the first main guide link and of the second main guide link, each having at least one vertical component.

The first main guide link is suitably mounted so that it can rotate in a first pivot point being fixed with respect to the vehicle body, thereby affording the folding top a secure support. The guide link element is preferably mounted in a second pivot point being fixed with respect to the vehicle body. In this configuration the second main guide link is suitably guided entirely by the guide link element.

The folding top preferably has a drive element embodied as a linear drive, which assists the displacement movement of the folding top and in particular evens out a drive force needed for the displacement movement over the entire swivel travel. The drive element is preferably directly supported on two elements of the main guide link mechanism, that is to say on the first main guide link on the one hand and one of the guide link element and the second main guide link on the other. The point of application of the drive element on the first main guide link and the point of application of the drive element on the one of the guide link element and the second main guide link advantageously form two force introduction points of the main guide link mechanism which are independent of one another in respect of the torque exerted. The torque introduced in each case here results from the angle included by the drive element and the respective lever arm, so that on actuation of the drive element two different torques are introduced into the main guide link mechanism, depending on the position of the first main guide link, the second main guide link or the guide link element, and the drive element. The torques introduced, which also may well be directed in opposite directions to one another, are superimposed on one another, so that through a corresponding arrangement the overall torque exerted on the main guide link mechanism is more easily adjustable to the torque actually needed for swiveling the folding top. In each folding top position the drive element preferably delivers a torque which is only slightly less than the torque needed for a swiveling of the folding top. A swiveling of the folding top can then be done manually or driven by means of a separate drive device, thereby minimizing the force required to do this. An especially free-running displacement of the folding top is therefore possible. The superimposition of the two torques exerted furthermore advantageously means that a large torque can be achieved even with first and second lever arms of relatively short dimensions, resulting in a very compact construction, compared to an arrangement of the drive element on the main guide link mechanism on the one hand and a point fixed to the vehicle body on the other.

The drive element preferably comprises an energy storing device, in which forces exerted by the weight of the folding top can be stored, especially towards the end of the folding top movement. The storage in the drive element of the force exerted by the weight of the folding top advantageously gives rise to a braking of the folding top movement close to the respective limit position of the folding top, so that additional braking or damping elements can be dispensed with. In addition at least a proportion of the energy needed for the initiation of the next folding top movement is advantageously already stored in the drive element. Overall, therefore, the drive element has a low energy requirement, it being especially preferred if an external energy supply is dispensed with altogether. This simplifies any fitting or replacement of the drive element.

The drive element is preferably embodied as a spring element, in particular as a gas-filled compression spring. A reliable drive action and energy storage, not susceptible to faults, are thereby ensured.

In a preferred development the first lever arm is arranged at least predominantly perpendicularly to the drive element when the folding top is in one of the closed position and the opened position, the second lever arm being arranged at least predominantly parallel to the drive element when the folding top is in the one of the closed position and the opened position. In this arrangement the first lever arm is advantageously capable of delivering an especially high torque, whilst the second point of action of the drive element finds a reliable support due to the position of the drive element, at least largely parallel to the lever arm. The drive force delivered by the drive element can therefore be delivered almost entirely as torque in the one of the closed position and the opened position, so that the particularly large drive demand at the beginning of the displacement movement is reliably met. Rapidly diminishing peaks in the torque needed for the folding top movement can be compensated for, especially when the next directly ensuing folding top movement occurs in such a way that the torque introduced on the first lever arm and the torque introduced on the second lever arm are opposed to one another.

It is particularly advantageous if the first lever arm in the other of the closed position and the opened position of the folding top is arranged at least in the main parallel to the drive element, the second lever arm in the other position of the folding top being arranged at least in the main perpendicular to the drive element. In the other of the closed position and the opened position also, therefore, the maximum drive force delivered by the drive element can be introduced virtually entirely as torque into the main guide link mechanism.

The folding top appropriately comprises actuating means for a displacement of the folding top. For a manual displacement of the folding top the actuating means may be embodied, for example, as a handle or the like. It has to be understood that a drive device for an automatic displacement of the folding top may be alternatively or additionally provided. In each case the drive element serves to even out and to minimize the force needed for the displacement of the folding top, so that swiveling of the folding top by use of the actuating means runs freely.

Further advantages and features of the invention are set forth in the following description of a preferred exemplary embodiment and in the dependent claims.

DETAILED DESCRIPTION OF PREFERRED EXEMPLARY EMBODIMENTS

The first exemplary embodiment of a folding top 1 represented in FIG. 1 to FIG. 9 is in this case embodied as a fabric folding top. FIG. 1a schematically shows folding top 100 represented as hard-shell folding top. The folding top 1 in its fully closed position spans a vehicle passenger compartment 2 of the convertible vehicle equipped with two rows of seats. The folding top 1 is therefore particularly large in longitudinal extent, compared to a folding top of a two-seat convertible vehicle. It has to be understood, however, that a folding top according to the invention can also be intended for a convertible vehicle with only one or more than two rows of seats.

In the representations in FIG. 1 to FIG. 9 a folding top fabric spanning the folding top linkage of the folding top 1 has been omitted for the sake of greater clarity. As can be seen particularly well in FIG. 1 to FIG. 3, the folding top can be displaced between the fully closed position spanning the vehicle passenger compartment 2 and a fully opened position represented in FIG. 3. In the fully opened position the folding top 1 is stowed in a rear area 3 of the vehicle. As will be explained in more detail below, the folding top is displaced between the closed position and the opened position by manual actuation.

Figure 4:
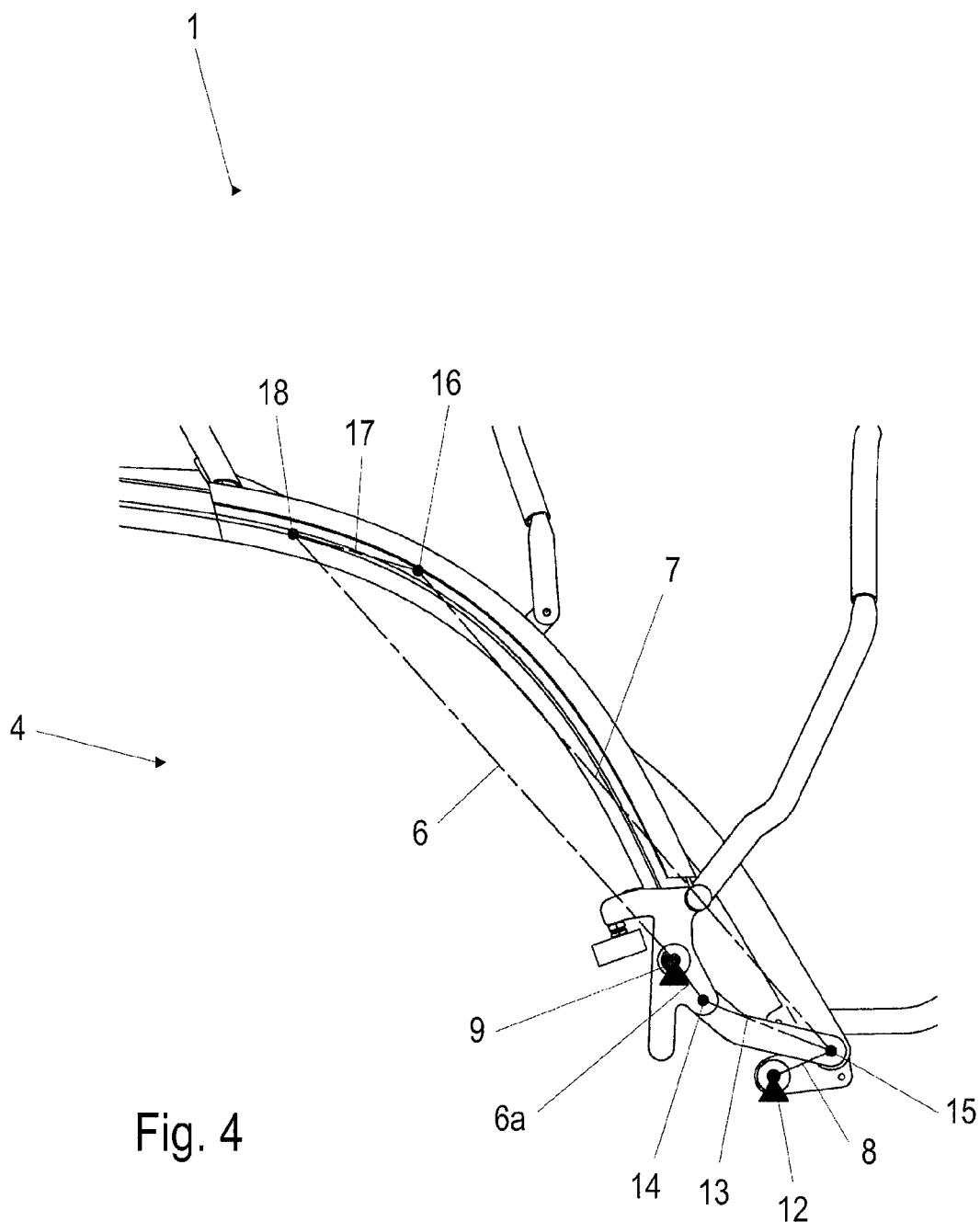
FIG. 4 shows parts of the folding top linkage of the folding top in FIG. 1 in a fully closed position.
Figure 5:
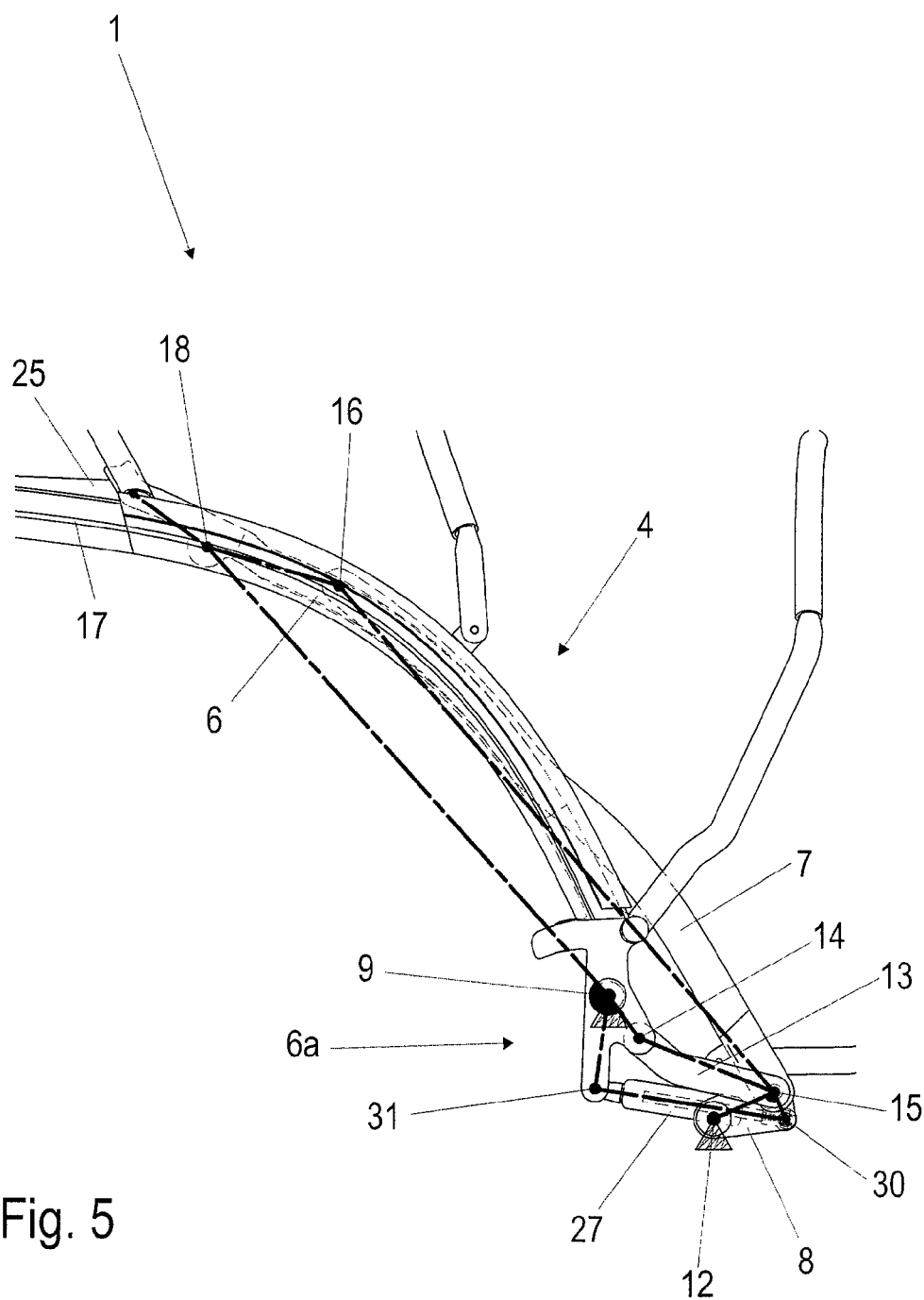
FIG. 5 shows the elements of the folding top linkage in a view according to FIG. 4, concealed parts of the folding top being additionally represented by dashed lines.
Figure 6:
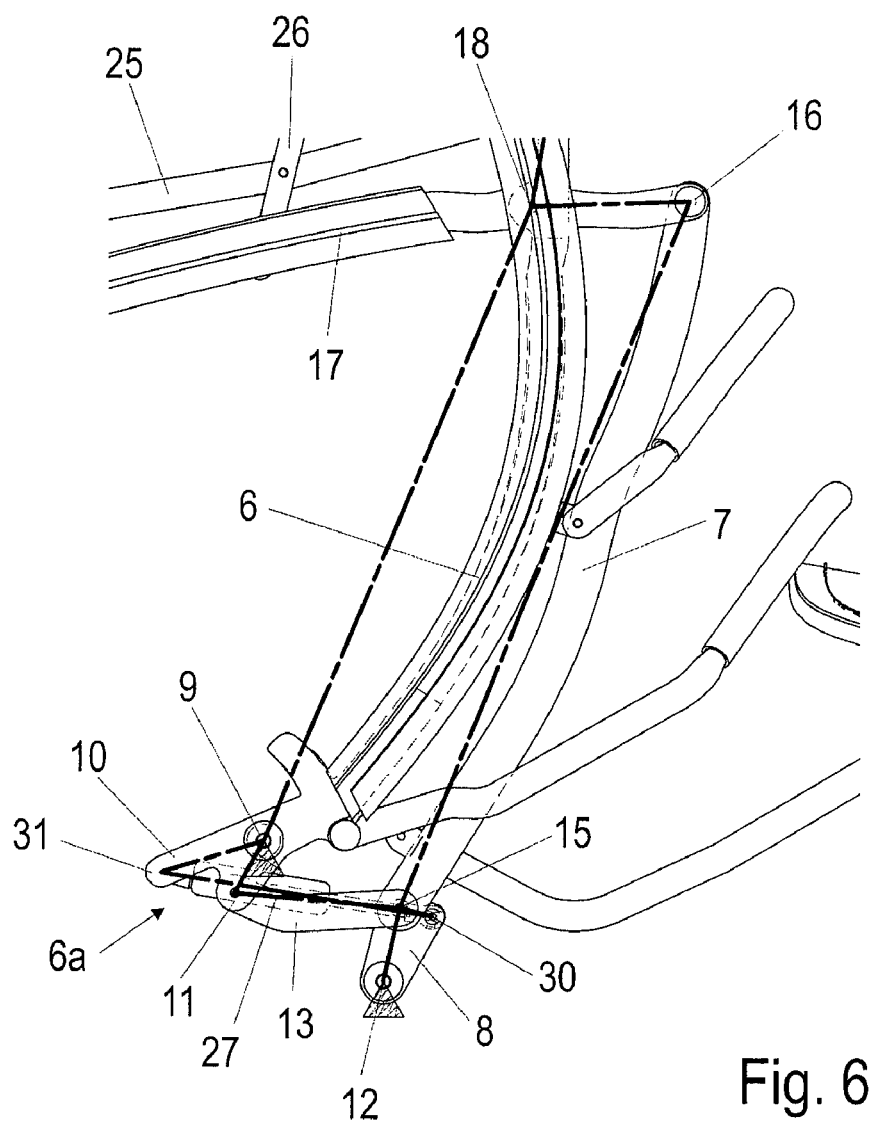
FIG. 6 shows the elements of the folding top linkage in FIG. 4 in a partially opened position.
Figure 7:
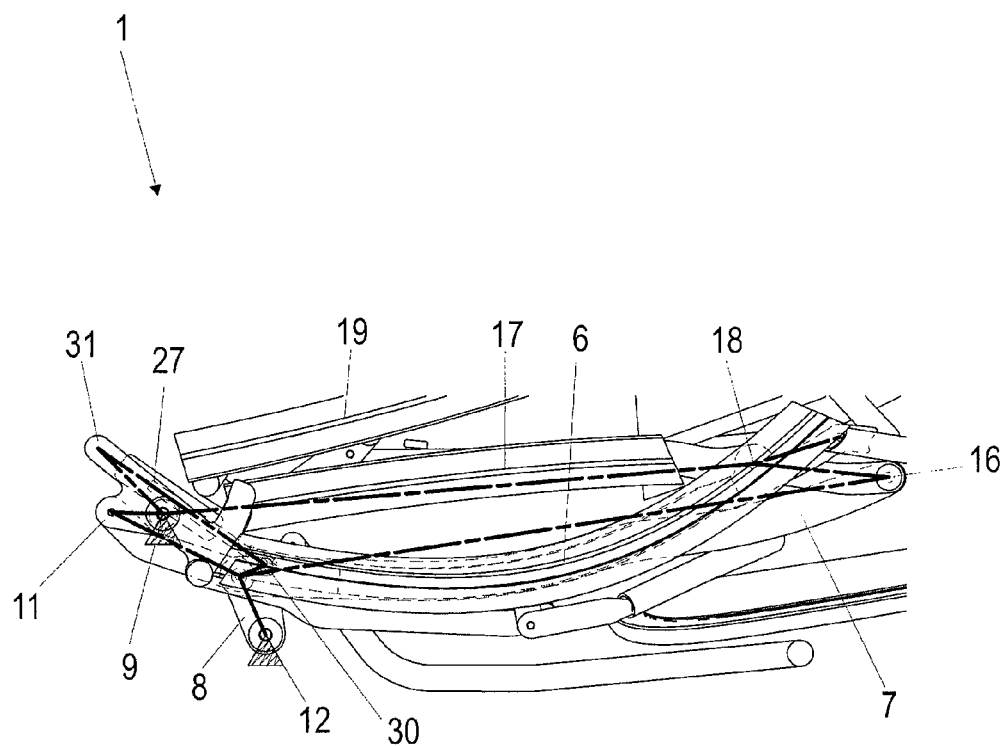
FIG. 7 shows the elements of the folding top linkage in FIG. 4 in a fully opened position.
Figure 8:
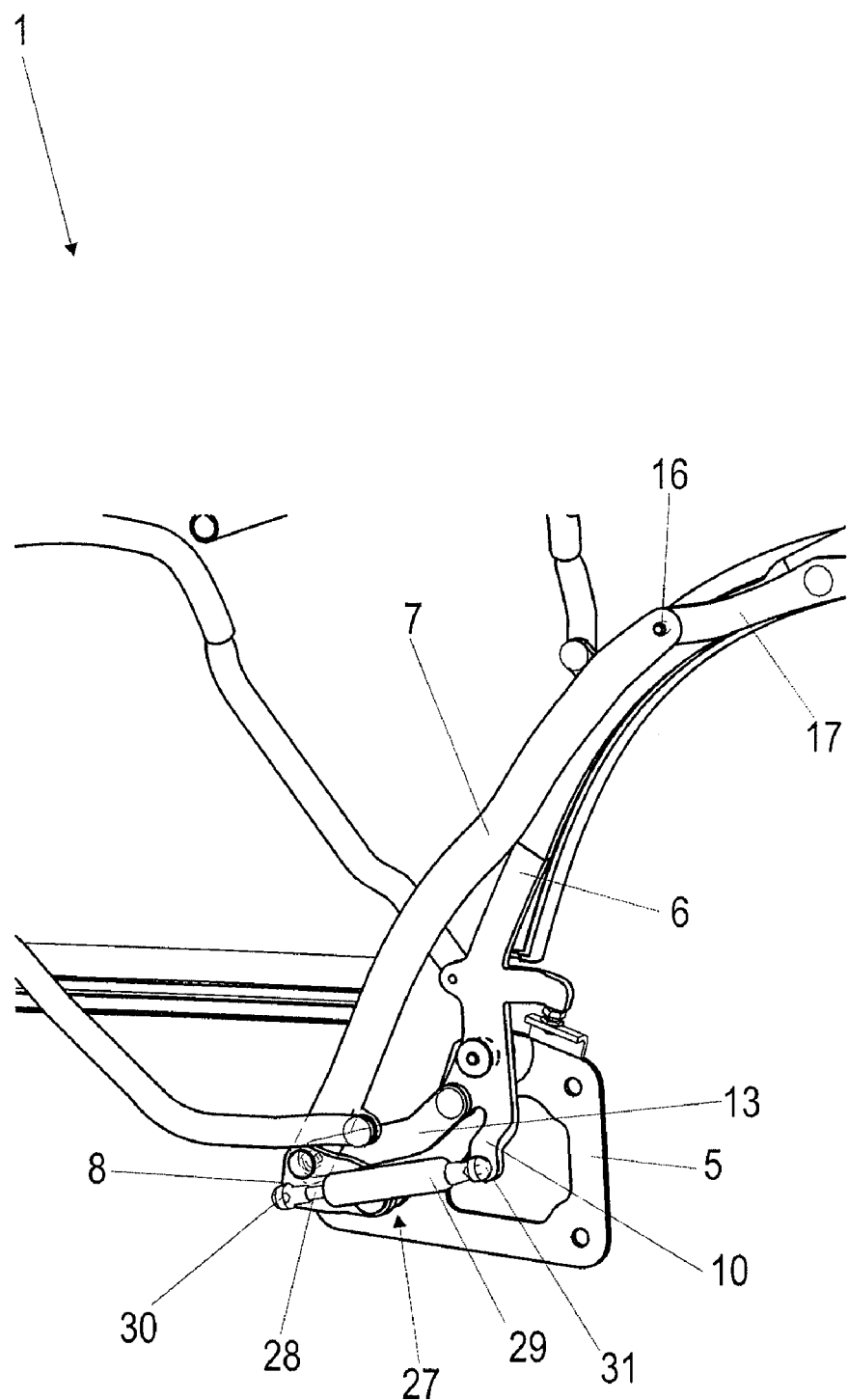
FIG. 8 shows a perspective view of parts of the folding top linkage from the vehicle passenger compartment.
Figure 9:
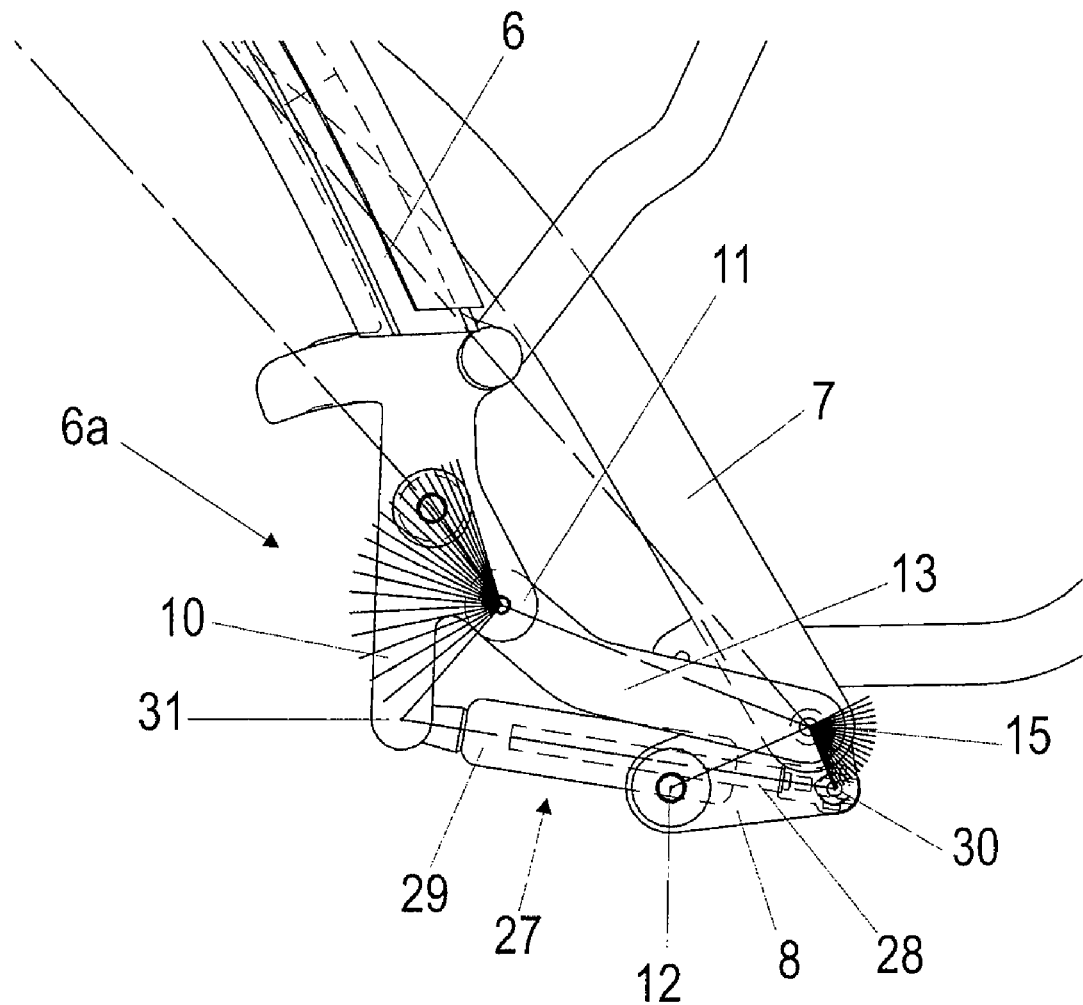
FIG. 9 shows a detailed view of the folding top linkage.

The folding top linkage carrying the folding top fabric comprises a main guide link mechanism 4, here embodied as a seven-bar linkage, which is supported by a main bearing unit 5 fixed to the lateral body of the vehicle. Only the main guide link mechanism 4 located on the left-hand side in the direction of travel is represented in each of FIGS. 1 to 9. Identical elements, mirror symmetrical with these, are located on the right-hand side of the vehicle, viewed in the direction of travel. In the following description reference is in each case made solely to the parts of the folding top located on the left-hand side of the vehicle. In addition to the actual folding top parts a simplified spar model of the main guide link mechanism 4 is shown in FIG. 4 to FIG. 7. In FIG. 4 unlike the other figures, parts of the spar model corresponding to the respective parts of the main guide link mechanism 4 are provided with reference numerals.

The main guide link mechanism 4 comprises a first main guide link 6, a second main guide link 7 and a guide link element 8. At an upper folding top-side end, the first main guide link 6 has an articulated connection to a first folding top element 17 and in a lower, vehicle body-side area in a first pivot point 9 fixed with respect to the vehicle body is rotatably mounted on the main bearing unit 5. The first main guide link 6 has an extension 6a, extending downwards beyond the first pivot point 9, with a first arm 10 and a second arm 11. Also arranged on the first main guide link 6 in an area located between the first pivot point 9 and the first folding top element 17 is a projection pointing in the direction of travel. This projection has a stop element for limiting a swivel movement of the first main guide link 6 in the direction of travel. A stop area interacting with the stop element is located on the main bearing unit 5 fixed to the vehicle body.

The guide link element 8 is in this case embodied as a short, laminar guide link with a substantially triangular base area. At a first corner of its base area the guide link element 8 is rotatably mounted in a second pivot point 12 being fixed with respect to the vehicle body on the main bearing unit 5. The axis of rotation of the guide link element 8 running through the second pivot point 12 and the axis of rotation of the first main guide link 6 running through the first pivot point 9 are arranged parallel to one another. A coupling link 13, which in a third pivot point 14 is pivotally connected to the first arm 10 of the extension 6a of the first main guide link 6 and in a fourth pivot point 15 is pivotally connected to the guide link element 8, couples a swiveling movement of the first main guide link 6 about the first pivot point 9 and a swiveling movement of the guide link element 8 about the second pivot point 12 together. Alternatively, the coupling link may be designed to act on the second main guide link 7 at a fourth pivot point.

Besides the coupling link 13 the second main guide link 7 is also swivel-mounted on the first guide link element 8 in the fourth pivot point 15 of the guide link element 8. The second main guide link 7 is rotatably connected to the first folding top element 17 in a fifth pivot point 16 at an end remote from the fourth pivot point 15. The first main guide link 6, the second main guide link 7, the guide link element 8, the coupling link 13 and the folding top element 17 together form a seven-bar linkage arrangement, the fourth pivot point 15, which connects the coupling link 13, the second main guide link 7 and the guide link element together, forming a double pivot point. A sixth pivot point 18 of the seven-bar linkage arrangement is defined by the articulated connection of the first main guide link 6 to the first folding top element 17.

Figure 1A:
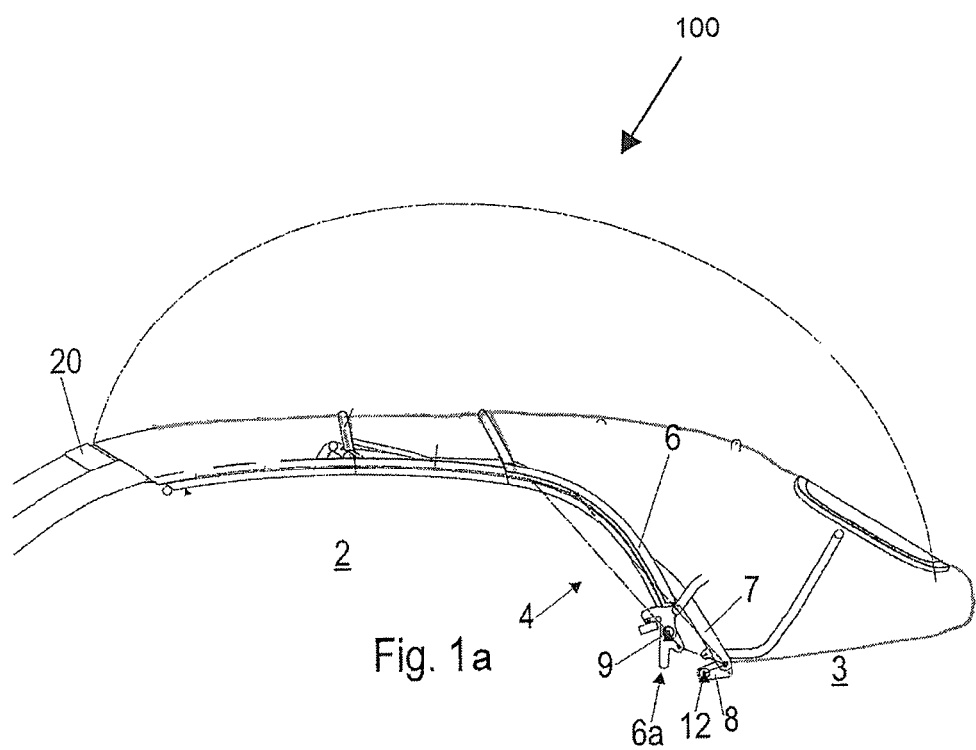
FIG. 1 shows a first exemplary embodiment of a folding top according to the invention for a convertible vehicle in a fully closed position.
Figure 2:
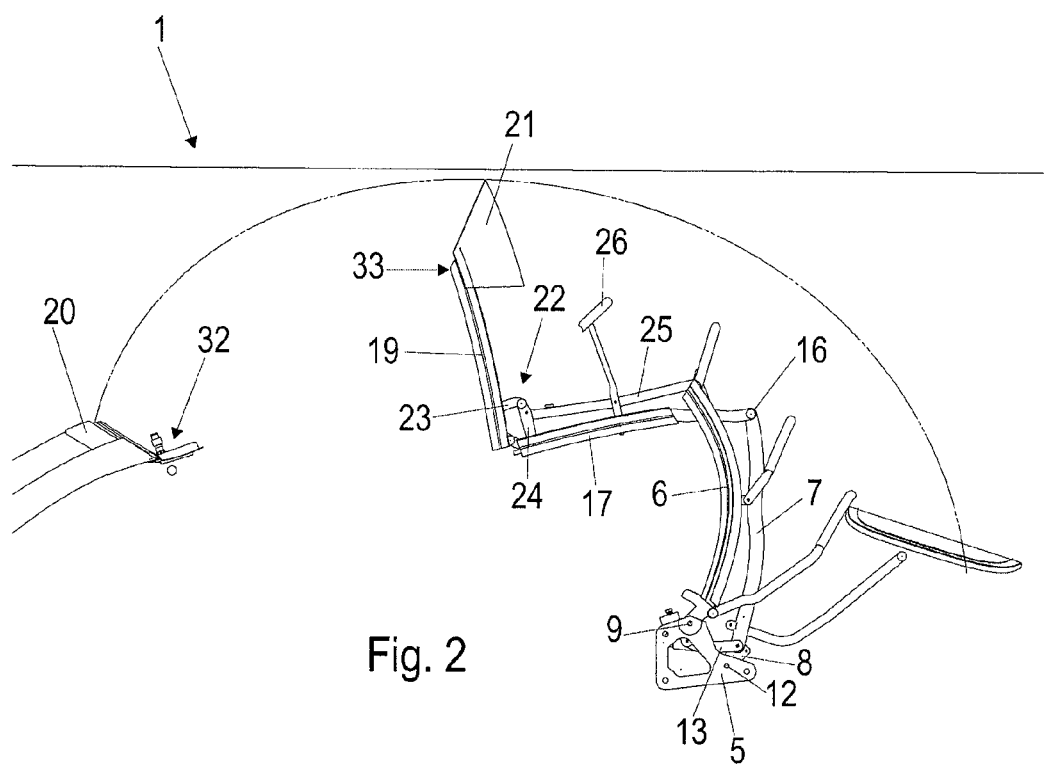
FIG. 2 shows the folding top in FIG. 1 in a partially opened position.
Figure 3:
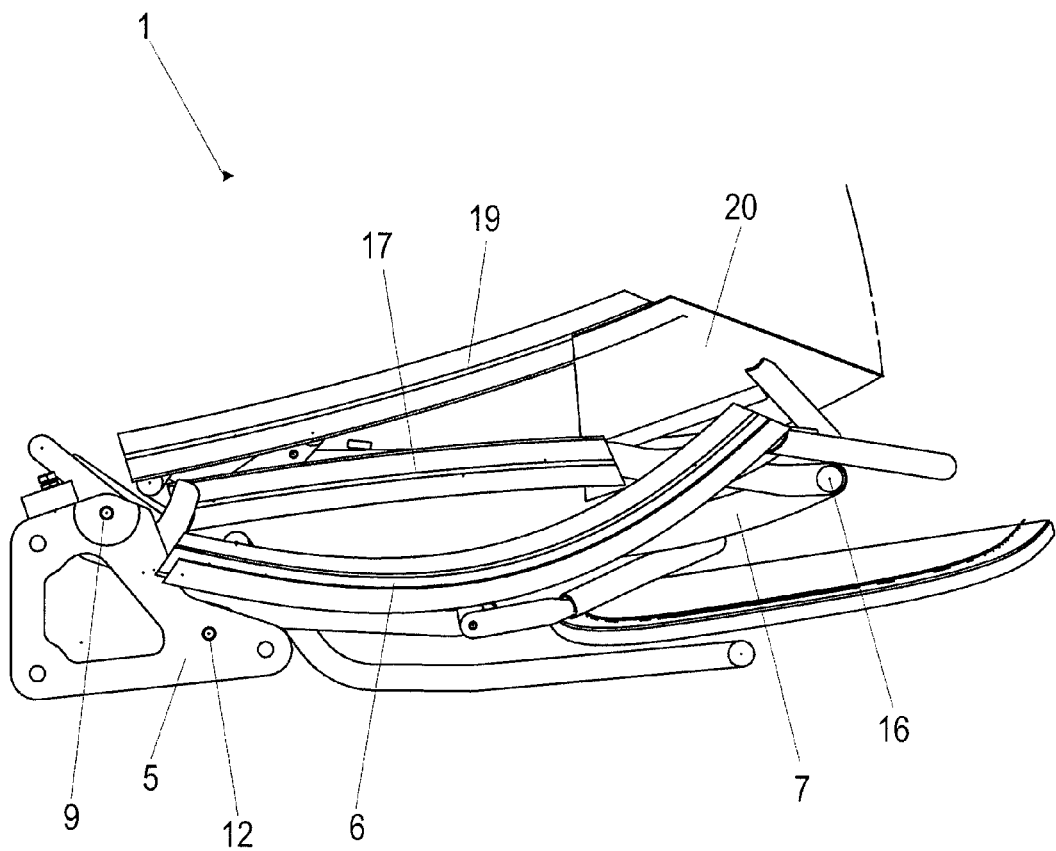
FIG. 3 shows the folding top in FIG. 1 in a fully opened position.

As can be clearly seen from FIG. 2, in particular, the fifth pivot point 16 and the sixth pivot point 18 are arranged in a rear area of the first folding top element 17, viewed in the direction of travel. The first folding top element 17 extends from this area further forwards in the direction of travel and adjoins a second folding top element 19. With the folding top closed, the second folding top element 19 is in turn situated adjacent to a cowl 20 of the convertible vehicle and carries a front bow 21 of the folding top. The first folding top element 17 and the second folding top element 19 are each embodied as roof frame parts. The second folding top element 19 is mounted by way of a coupling four-bar linkage 22 on the first folding top element 17. The first folding top element 17 here forms a base and the second folding top element 19 forms a first guide link of the coupling four-bar linkage 22. The coupling four-bar linkage 22 further comprises a first auxiliary guide link 23 and a second auxiliary guide link 24, the first auxiliary guide link 23 forming a coupling link of the coupling four-bar linkage 22. Connecting the second folding top element 19 to the first folding top element 17 by way of the coupling four-bar linkage 22 allows the second folding top element 19 to swivel over an especially large angular range. The second auxiliary guide link 24 of the coupling four-bar linkage 22 is connected by way of a control rod 25 to a second extension of the first main guide link 6 projecting beyond the sixth pivot point 18. As the main guide link mechanism 4 swivels, therefore, the coupling four-bar linkage 22 is also swiveled, driven by means of the control rod 25. As can clearly be seen from FIG. 2, in particular, a first transverse bow 26 of the folding top 1 is also articulated on the folding top element 17 on the one hand and on the control rod 25 on the other, so that the first transverse bow 26 is also displaceable, driven by a swiveling of the main guide link mechanism 4. Altogether, therefore, the folding top linkage forms a positively guided linkage chain.

In order to ensure a free-running displacement facility of the folding top 1 between the closed position and the opened position, the folding top 1 has a drive element 27, visible in FIG. 5 to FIG. 9, which in this case is embodied as a gas-filled compression spring. The drive element 27 is arranged in the area of the main bearing unit 5 and comprises a drive rod 28 and a drive housing 29, which are linearly adjustable in relation to one another. The drive housing 29 is mounted in a second force introduction point 31 on the first arm 10 of the extension of the first main guide link 6, the distance between the second force introduction point 31 and the first pivot point 9 fixed to the vehicle body defining a first lever arm, via which a torque can be introduced into the first main guide link 6. The drive rod 28 is mounted in a first force introduction point 30 on the guide link element 8. The distance between the first force introduction point 30 and the first pivot point 9 of the guide link element 8 fixed to the vehicle body here defines a second lever arm, via which a torque can be introduced into the guide link element 8. An actuation of the drive element 27 therefore simultaneously exerts a torque on the guide link element 8 via the first lever arm and on the first main guide link 6 via the second lever arm, the respective torque being determined not only by the force exerted by the drive element 27 but also by the angle between the drive element 27 and the first or second lever arm. As can clearly be seen from the representation in FIG. 5 to FIG. 7, when the entire main guide link mechanism 4 swivels, the drive element 27 is displaced in relation to the vehicle body and the main bearing unit 5 fixed to the vehicle body.

The invention now functions as follows:

In the closed position of the folding top (FIG. 1) the first main guide link 6, the folding top element 17 and the second roof frame part 19 adjoin one another and together form a roof frame, which extends from the main bearing unit 5 fixed to the vehicle body to the cowl 20 of the vehicle. The profile of the roof frame with the folding top closed defines a curve, hereinafter referred to as the roof line. The roof line forms an upper limit of the vehicle passenger compartment, no parts of the folding top 1 being allowed to dip into the area below the roof line during a displacement movement of the folding top 1 into the opened position, so as to exclude any risk of injury to persons in the convertible vehicle.

After releasing a locking device 32, which with the folding top closed couples the front bow 21 to the cowl 20, the folding top 1 can be swiveled into the opened position by means of a handle 33 arranged on the vehicle interior of the is front bow 21. To do this, an upward force is exerted on the front bow 21 counter to the direction of travel. The displacement of the folding top 1 is here assisted by the drive element 27, so that only a minimal drive force, substantially constant over the entire displacement movement of the folding top 1, is needed. As can clearly be seen in FIG. 5, in particular, the drive element 27 in the closed position of the folding top 1 is located substantially perpendicular to the first lever arm, so that a large torque is introduced into the main guide link 6. At the same time the drive element 27 runs substantially parallel to guide link element 8, arranged virtually horizontally, so that only a small torque, if any, is introduced into the guide link element 8. The drive element 27 therefore delivers a maximum torque for a swiveling of the main guide link mechanism 4.

In the first phase of the displacement movement of the folding top 1 the first main guide link 6 swivels counter to the direction of travel (clockwise according to the representation in FIG. 1 to FIG. 7) about the first pivot point 9 fixed to the vehicle body, whilst the guide link element 8 swivels in the direction of travel (counter-clockwise). Overall, the first force introduction point 30 located on the first main guide link 6 and the second force introduction point 31 located on the guide link element 8 are distanced from one another, so that the drive rod 28 disengages from the drive housing 29. The torque exerted on the first main guide link 6 assists the swiveling movement of the main guide link 6, whilst the torque exerted on the guide link element 8 counteracts the swiveling of the guide link element 8. In the course of the displacement movement the angle between the drive element 27 and the first lever arm decreases and the torque introduced into the main guide link 6 diminishes. Conversely the angle between the drive element 27 and the second lever arm increases, and the torque introduced into the guide link element 8 increases. As a whole, the overall torque introduced into the main guide link mechanism 4 by the drive element 27 is therefore greatly reduced from a maximum at the beginning of the displacement movement. This profile of the overall torque assisting the displacement movement also matches the profile of the total torque needed for the displacement movement.

Figure 11:
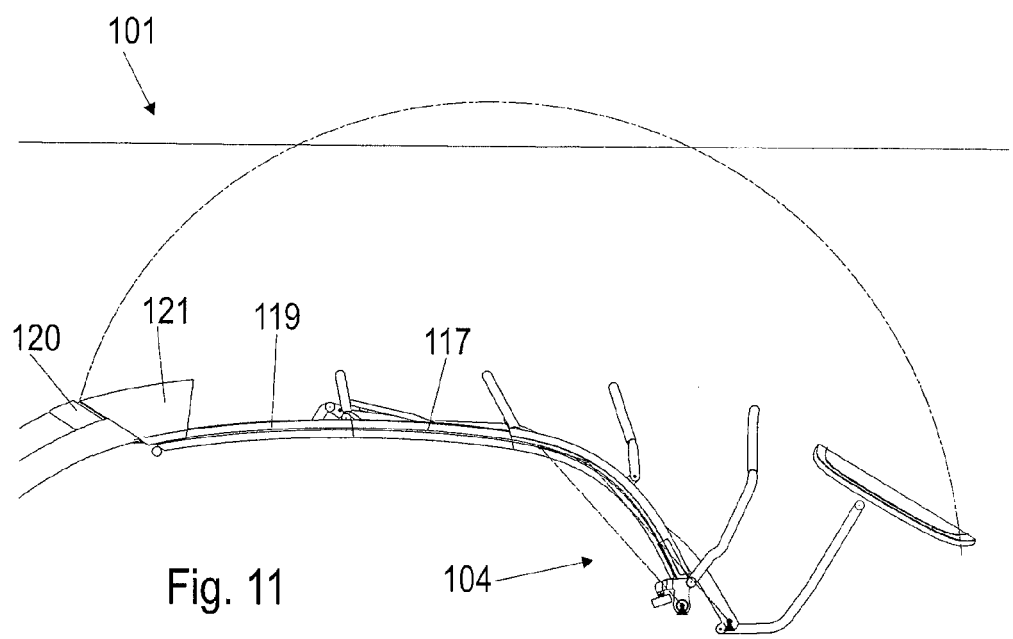
FIG. 11 shows a side view of a folding top known from the state of the art in a fully closed position.
Figure 12:
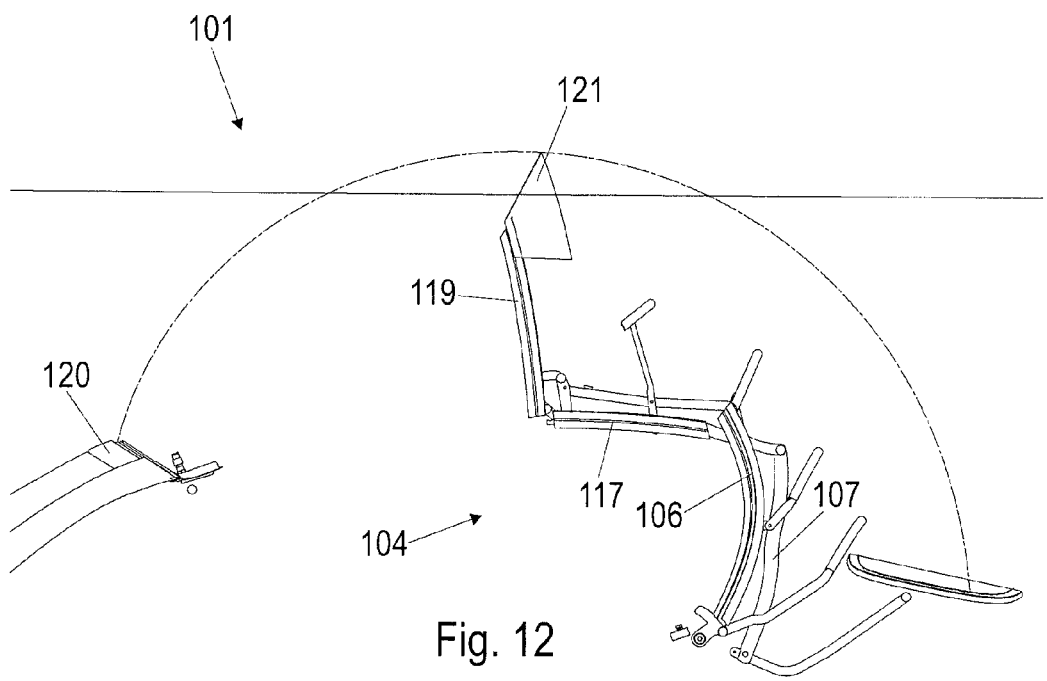
FIG. 12 shows the folding top in FIG. 11 in a partially opened position.
Figure 13:
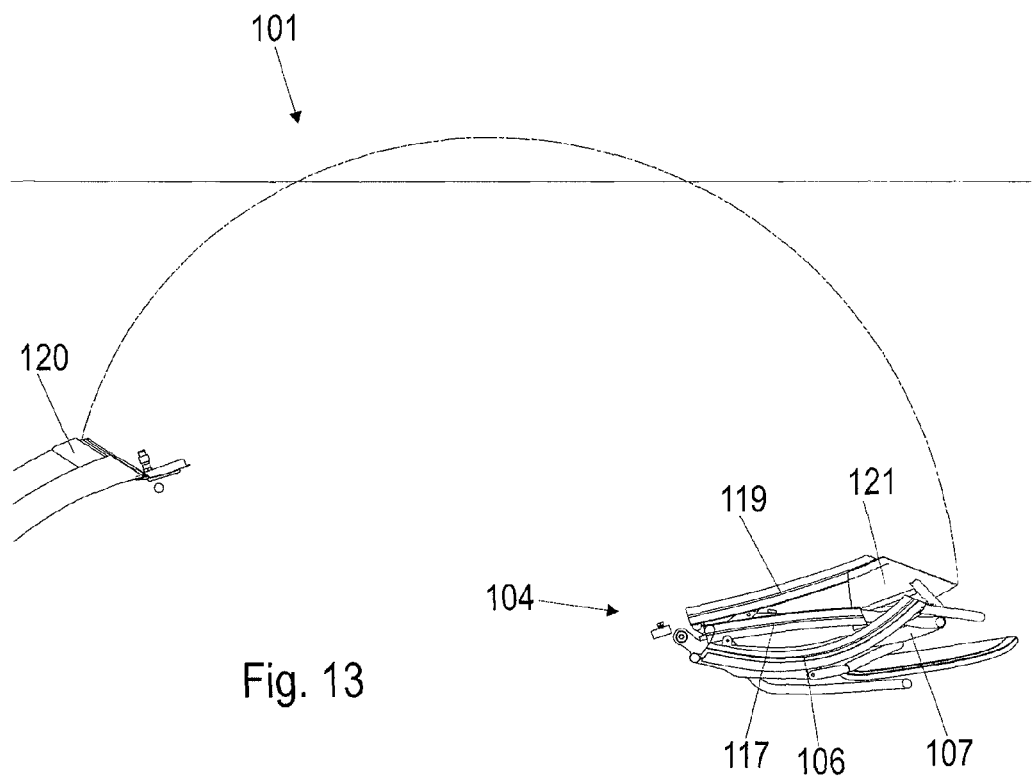
FIG. 13 shows the folding top in FIG. 11 in a fully opened position.
Figure 14:
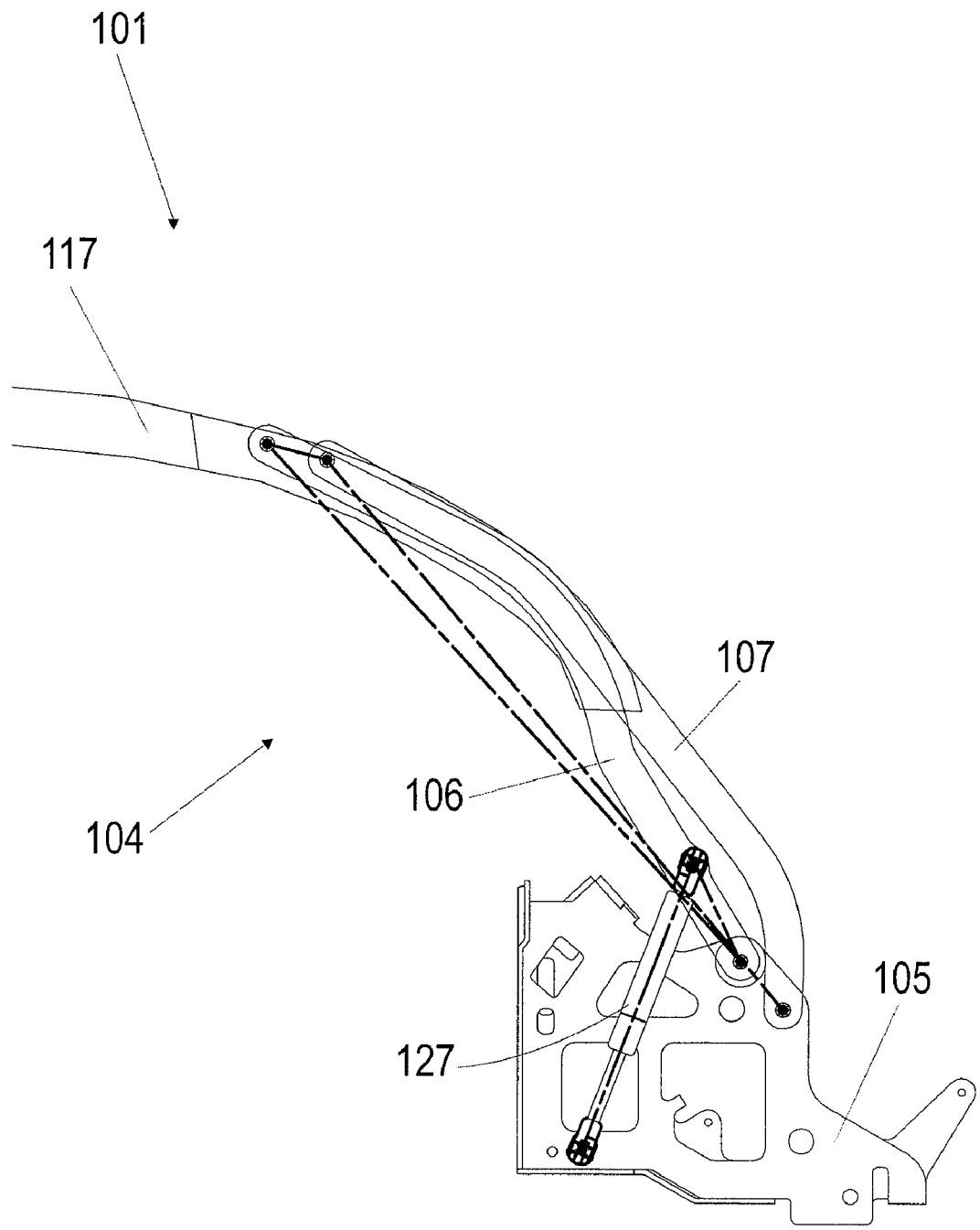
FIG. 14 shows elements of the folding top linkage of the folding top according to FIG. 11 in a fully closed position.
Figure 15:
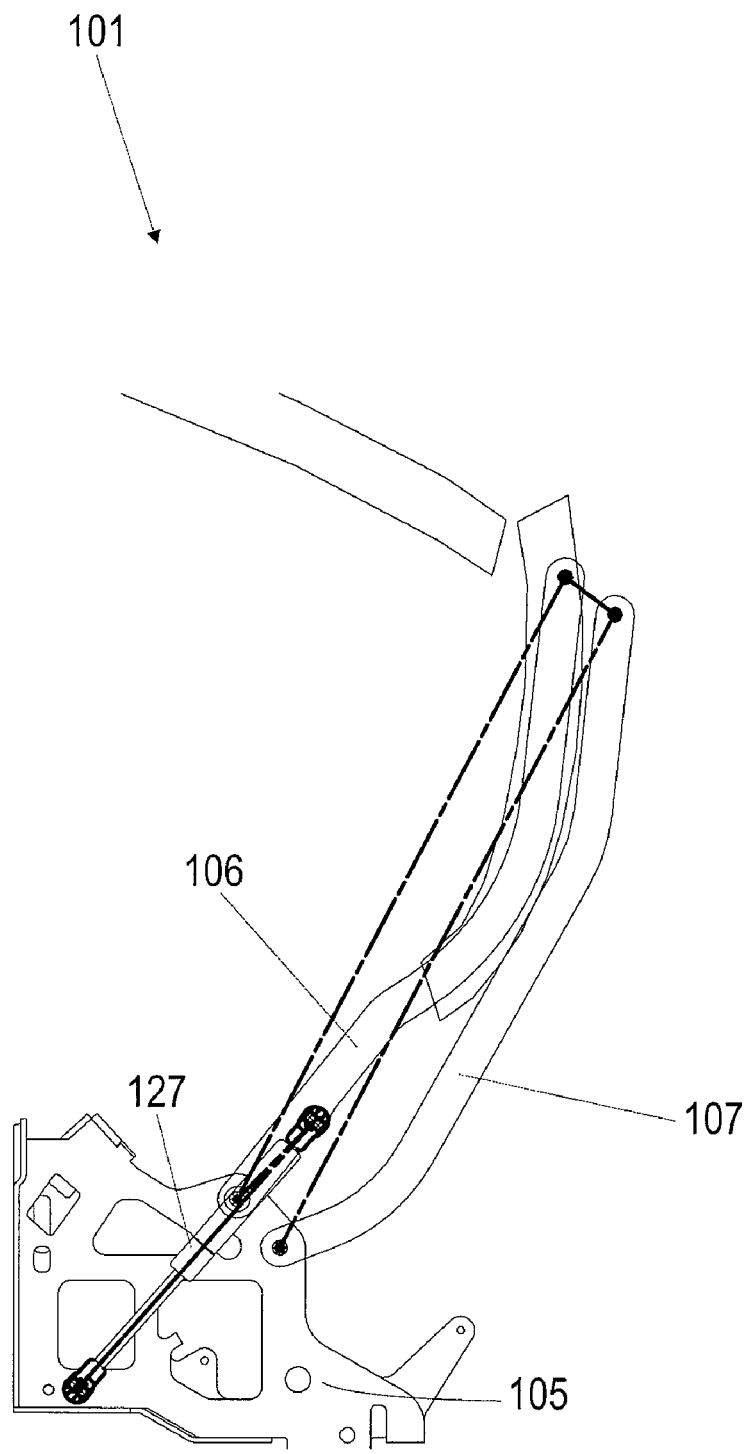
FIG. 15 shows the elements of the folding top linkage according to FIG. 14 in a partially opened position.
Figure 16:
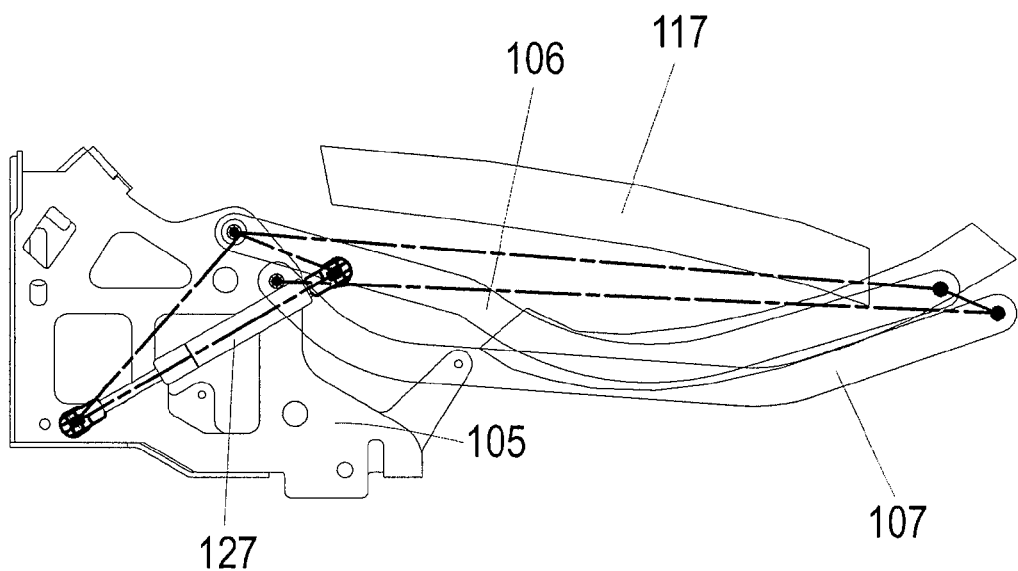
FIG. 16 shows the elements of the folding top linkage according to FIG. 14 in a fully opened position.

Besides the first main guide link 6, the second main guide link 7 also swivels counter to the direction of travel, as can clearly be seen from FIG. 1 and FIG. 2. The swiveling movement, directed in the direction of travel, of the guide link element 8 carrying second main guide link 7 here impresses an additional movement, substantially directed vertically upwards, on the second main guide link 7. The first folding top element 17 mounted on the first main guide link 6 and the second main guide link 7 thereby experiences not only a movement directed substantially horizontally counter to the direction of travel, but also a swiveling movement of the front end towards the vehicle passenger compartment 2, viewed in the direction of travel. Overall, the second folding top element 19 is also correspondingly displaced towards the vehicle passenger compartment 2. Owing to the relatively short length of the guide link element 8, the swiveling of the first folding top element towards the vehicle passenger compartment 2 is limited to just a small angle. It is thus ensured that in the course of the overall displacement movement no parts of the folding top 1 come below the roof line of the folding top and intrude into the vehicle passenger compartment. The displacement of the second folding top element 19 towards the vehicle passenger compartment advantageously serves to reduce the clear vertical height needed for opening of the folding top, as emerges, in particular, from a comparison of FIG. 2 with the folding top 101 known from the state of the art and shown in FIG. 11 and FIG. 12.

The overall torque introduced into the main guide link mechanism 4 by the drive element 27 reaches a minimum approximately in the middle position of the folding top 1. From this middle position of the folding top 1 onwards, a further swiveling of the folding top 1 is increasingly driven by the weight of the folding top 1. The first main guide link 6 here swivels further about the first pivot point counter to the direction of travel, the guide link element 8 continues to swivel about the second pivot point in the direction of travel. In the process, the first force introduction point 30 and the second force introduction point 31 move towards one another, the drive rod 28 engages in the drive housing 29 and overall the drive element 27 is therefore tensioned again. As can clearly be seen from FIG. 7, in particular, the drive element 27, in the fully opened position of the folding top 1, is located in such a way that the first lever arm runs substantially parallel to the drive element 27 and the second lever runs substantially parallel to the drive element 27. A maximum torque is accordingly available for a now reverse displacement movement of the folding top from the opened position into the closed position.

A swiveling of the folding top from the opened position into the closed position is performed in correspondingly reverse order.

Figure 10:
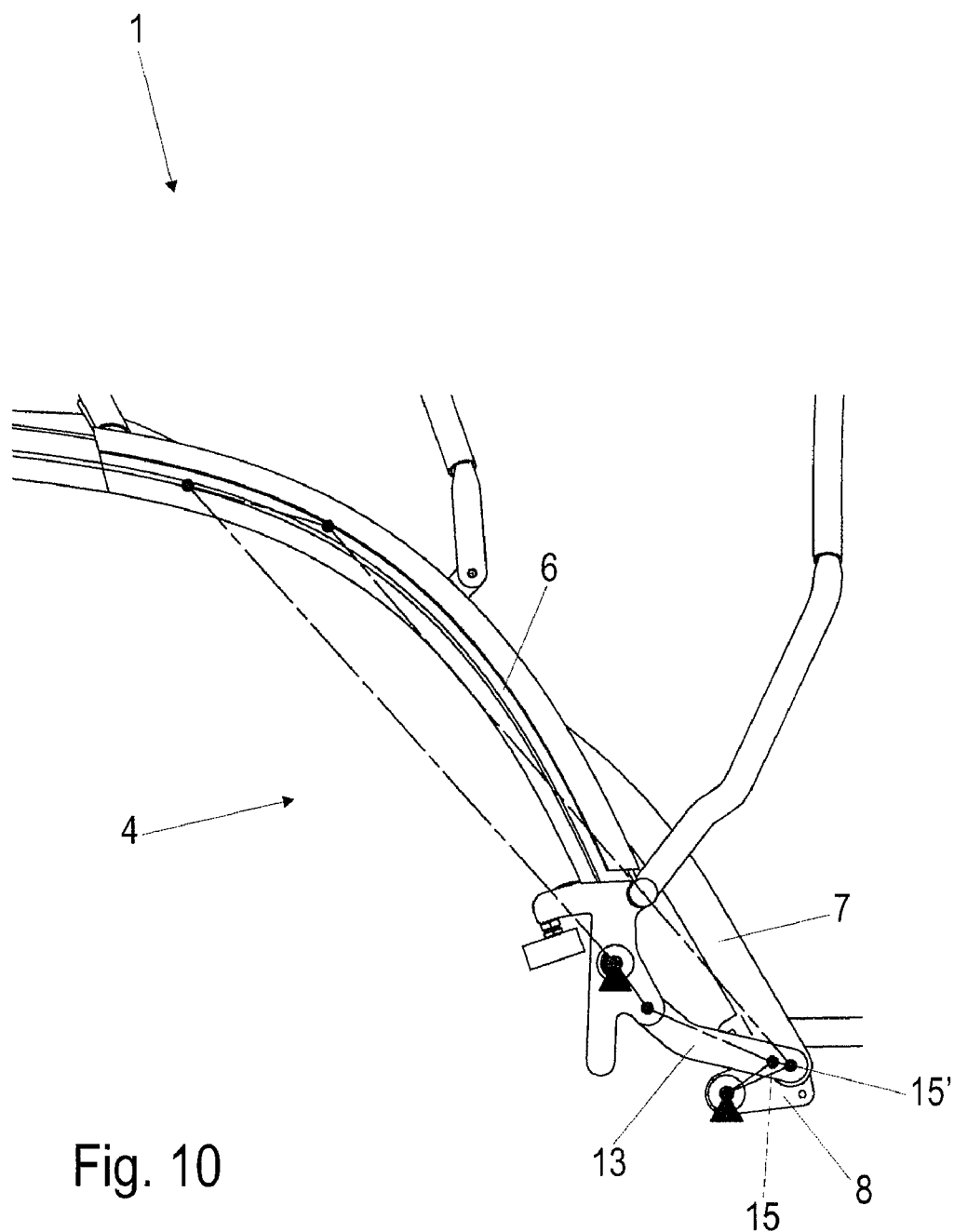
FIG. 10 shows a second exemplary embodiment of a folding top according to the invention for a convertible vehicle.

FIG. 10 shows a second exemplary embodiment of a folding top 1 for a convertible vehicle. Identical parts of the folding top 1 or parts exercising essentially similar effects to those in the first exemplary embodiment are provided with the same reference numerals.

In a departure from the first exemplary embodiment, in the folding top 1 according to the second exemplary embodiment the fourth pivot point 15 connecting the coupling link 13 to the guide link element 8 and a seventh pivot point 15' connecting the second main guide link 7 to the guide link element 8 are located at an interval from one another. An axis of rotation of the coupling link 13 running through the fourth pivot point 15 and an axis of rotation of the second main guide link 7 running through the seventh pivot point 15' are in this case parallel to one another. The spaced arrangement of the fourth pivot point 15 and the seventh pivot point 15' permits an optimized configuration of the main guide link mechanism 4 in respect of the displacement travel of the second main guide link 7.

The invention has been explained above with reference to exemplary embodiments, which in each case show a folding top embodied as a fabric folding top. It will has to be understood that a folding top according to the invention may likewise be embodied as a hard-shell folding top, at least one of the first and second folding top elements in particular forming a solid roof shell or a roof frame element carrying a solid roof shell. It furthermore has to be understood that instead of a manual actuation the displacement movement of the folding top described may be automated and driven by a drive device acting, in particular, on the main guide link mechanism.

The exemplary embodiments described above each have a main guide link mechanism embodied as a seven-bar linkage. It has to be understood that, as an alternative to the articulation of the coupling link on the guide link element, an articulation on the second main guide link is also possible. Likewise the drive element may in each case act directly on the first and the second main guide links.

What is claimed is:

1. A folding top for a convertible vehicle, wherein the folding top can be displaced between a closed position and an opened position, comprising
    a main guide link mechanism with a first main guide link, a second main guide link and a guide link element, and
    a first folding top element,
    a linear drive element,
    wherein the first folding top element pivotally couples the first main guide link and the second main guide link together, and
    wherein, starting from the closed position of the folding top, one of the first main guide link and the second main guide link can be displaced in a vertical direction by a swiveling of the guide link element,
    wherein a first end of the linear drive element acts on the first main guide link and together with the first main guide link defines a first lever arm, wherein a second end of the linear drive element acts on the guide link element and the second main guide link and wherein the second end of the linear drive element together with the guide link element and the second main guide link defines a second lever arm.

2. The folding top as claimed in claim 1, wherein the vertical displacement of the one of the first main guide link and the second main guide link is capable of applying a component motion, directed towards the vehicle passenger compartment, to a front end of the first folding top element, viewed in the direction of travel.

3. The folding top as claimed in claim 1, wherein the first main guide link is rotatably mounted in a first pivot point, said first pivot point being fixed with respect to the vehicle body.

4. The folding top as claimed in claim 1, wherein the guide link element is rotatably mounted in a second pivot point, said second pivot point being fixed with respect to the vehicle body.

5. The folding top as claimed in claim 1, wherein the second main guide link is pivotally connected to the guide link element.

6. The folding top as claimed in claim 1, wherein the first folding top element during a displacement movement of the folding top is located entirely above a roofline of the folding top.

7. The folding top as claimed in claim 1, further comprising a coupling link connecting the first main guide link to either one of the second main guide link and the guide link element.

8. The folding top as claimed in claim 1, wherein the first lever arm is arranged at least predominantly perpendicularly to the linear drive element when the folding top is in the closed position, and wherein the second lever arm is arranged at least predominantly parallel to the linear drive element when the folding top is in the closed position.

9. The folding top as claimed in claim 8, wherein the first lever arm is arranged at least predominantly parallel to the linear drive element when the folding top is in the opened position, and wherein the second lever arm is arranged at least predominantly parallel to the linear drive element when the folding top is in the opened position.

10. The folding top as claimed in claim 1, wherein a second folding top element is mounted on the first folding top element.

11. The folding top as claimed in claim 10, wherein the second folding top element in the closed position of the folding top adjoins a cowl.

12. The folding top as claimed in claim 10, wherein the second folding top element during a displacement movement of the folding top is located entirely above a roof line of the folding top.

13. The folding top as claimed in claim 1, wherein the folding top is a fabric folding top.

14. The folding top as claimed in claim 1, wherein the folding top is a hard-shell folding top.

15. The folding top as claimed in claim 1, further comprising actuation means for a displacement of the folding top.

16. The folding top as claimed in claim 1, wherein the second end of the linear drive element is coupled to the guide link element such that the second end of the linear drive element is acting directly on the guide link element, the guide link element being coupled to the second main guide link such that the second end of the linear drive element is acting indirectly on the second main guide link.

17. A folding top for a convertible vehicle, wherein the folding top can be displaced between a closed position and an opened position, comprising
a main guide link mechanism with a first main guide link, a second main guide link and a guide link element, and
a first folding top element,
wherein the first folding top element pivotally couples the first main guide link and the second main guide link together, and
wherein, starting from the closed position of the folding top, one of the first main guide link and the second main guide link can be displaced in a vertical direction by a swiveling of the guide link element,
wherein the guide link element being pivotally mounted at a first pivot point, the first pivot point being fixed with respect to the vehicle body,
wherein the guide link element is a singular lever element between the second main guide link and the first pivot point,
wherein the guide link element has triangular base area, the first pivot point being located in a first corner of the triangle,
wherein the second main guide link is pivotally arranged at a second pivot point in a second corner of the triangle,
wherein a drive element is arranged between a third pivot point on the guide link element and a fourth pivot point on the first main guide link.

* * * * *